Patented May 1, 1928.

1,668,236

UNITED STATES PATENT OFFICE.

HARRY L. FISHER, OF AKRON, OHIO, ASSIGNOR TO THE B. F. GOODRICH COMPANY, OF NEW YORK, N. Y., A CORPORATION OF NEW YORK.

RUBBER COMPOSITION AND METHOD OF PRODUCING THE SAME.

No Drawing. Application filed January 17, 1924. Serial No. 686,899.

This invention relates to compositions of matter made from or containing rubber, and more specifically to the treatment of rubber with sulphuric acid and products so formed.

Heretofore, so far as I am aware, sulphuric acid has been caused to react upon rubber only in such large proportion of the acid as to produce a hard, granular, material having a high heat softening point, the reaction being comparable in this respect to the vulcanization of rubber with large amounts of sulphur to produce ebonite, and said granular material has required to be subjected to a high degree of heat or pressure to produce a cohesive mass.

My general object is to provide a new class of rubber compositions having certain desirable properties adapting them for various uses. A more specific object is to provide inexpensive, tough, heat-plastic derivatives of rubber suitable for uses similar to those of balata and gutta-percha. A further specific object is to provide materials of this character having a low heat-softening point as compared with products heretofore obtained from the reaction of sulphuric acid on rubber. A still further object is to provide an improved method of effecting a reaction between sulfuric acid and rubber.

I find that by mixing with rubber much smaller amounts of sulphuric acid than have heretofore been used, and heating the mixture, I am able to obtain a tough, highly heat-plastic product well suited for the manufacture of molded articles and other uses, the heat softening point being comparatively low.

By way of example, 5 parts by weight of concentrated sulphuric acid, specific gravity 1.84, are diluted with 1.25 parts of water and made into a paste with 2 parts of a material substantially inert to the acid, such as fossil flour or titanium oxide. This paste is then milled into 100 parts by weight of rubber, keeping the mill rolls as cold as possible. The water serves to delay the primary reaction of the acid and rubber, thereby permitting the acid to be well disseminated in the rubber before the primary reaction begins. The pigment facilitates the handling of the acid and also hastens the mixing of the acid with the rubber. The rubber is then sheeted out in sheets from ½ to 1 inch in thickness and heated for 15 to 20 hours at 125° C. to 130° C. The product is a hard, tough, thermo-plastic material which can be milled on a hot mill or otherwise manipulated for such purposes as the impregnation of fabric or the manufacture of molded goods.

This thermo-plastic material is also characterized by its high dielectric strength and by its susceptibility of being crushed at ordinary temperatures for molding of the crushed product, and of being re-milled at temperatures ranging from 30 to 70 pounds steam pressure. The material may be mixed with crude rubber or other plastics by milling, or may be compounded with fillers, pigments or colors.

A product having similar characteristics is obtained by the use of as high as 25 parts of acid in accordance with the above example, but when such high proportion of acid is used I prefer to use a larger proportion of pigment to acid, to permit the large amount of acid to be taken up by the rubber before the primary reaction has substantially advanced.

By using still smaller amounts of sulphuric acid than that set out in the above example, I am able to obtain a product similar in many respects to soft rubber vulcanized by the use of sulphur. By way of example, 2 to 3 parts of concentrated sulphuric acid properly mixed with ⅓ of its weight of fossil flour or other inert pigment is mixed into 100 parts by weight of rubber on a mill. The rubber so treated is then heated for about 20 hours at 130° C. in an oven, in a mold, or by other suitable means. The resulting product is resilient under compression, somewhat elastic, and in general resembles soft vulcanized rubber.

I desire it to be understood that the expression "concentrated sulphuric acid", as used hereinbefore in this specification and also in the appended claims, is intended only to define the proportion of active ingredient in the acid, and not as defining the concentration of the acid as used.

My invention is subject to modification without departing from its scope, and I do not wholly limit my claims to the exact procedure or to the exact proportions described herein.

I claim:

1. The method of producing a rubber composition which comprises mixing through a mass of rubber a relatively small quantity of sulfuric acid, and heating the resulting mixture to a reaction temperature.

2. The method of producing a rubber composition which comprises mixing into a mass of rubber sulfuric acid in amounts not substantially greater than the acid equivalent of 25 parts by weight of concentrated sulfuric acid (sp. gr. 1.84) to 100 parts by weight of rubber, and heating the resulting mixture to a reaction temperature.

3. The method of producing a rubber composition which comprises dispersing through a mass of rubber sulfuric acid in amounts ranging between the acid equivalent of from 2 to 25 parts by weight of concentrated sulfuric acid (sp. gr. 1.84) to 100 parts by weight of rubber, and heating the resulting mixture to a reaction temperature.

4. The method of producing a rubber composition which comprises effecting an intimate mixture of sulfuric acid and rubber, in the absence of a solvent of rubber, and so heating the mass as to form a tough, cohesive, heat-plastic, solid reaction product.

5. The method of producing a rubber composition which comprises mixing sulfuric acid with a solid constituting a carrier, milling the resulting mixture into a mass of rubber, and heating the resulting mass to a reaction temperature.

6. The method of producing a rubber composition which comprises mixing sulfuric acid with a carrier substantially inert to said acid, milling the resulting mixture into a mass of rubber, and heating the resulting mass to a reaction temperature.

7. The method of producing a rubber composition which comprises mixing sulfuric acid with a carrier substantially inert to said acid, milling such quantity of the mixture into a mass of rubber as to produce, upon heating of the resultant mass, a tough, cohesive, reaction product, and heating said resultant mass.

8. As a new composition of matter, the product of the reaction, in the absence of a solvent, of sulfuric acid and rubber in proportion of the acid equivalent of from 2 to 25 parts by weight of concentrated sulfuric acid (sp. gr. 1.84) to 100 parts of rubber.

9. As a new composition of matter, the product of the reaction under the influence of heat of sulfuric acid dispersed through a mass of rubber in the proportion of 100 parts by weight of rubber to the acid equivalent of from between 2 to 25 parts by weight of concentrated sulfuric acid (sp. gr. 1.84).

In witness whereof I have hereunto set my hand this 11th day of January, 1924.

HARRY L. FISHER.